United States Patent [19]

Nakajima

[11] Patent Number: 5,777,790
[45] Date of Patent: Jul. 7, 1998

[54] MICROSPHERE-BASED RETROREFLECTIVE ARTICLE

[75] Inventor: Toshitaka Nakajima, Yamagata pref., Japan

[73] Assignee: Minnesota Mining and Manufacturing Company, St. Paul, Minn.

[21] Appl. No.: 721,982

[22] PCT Filed: Apr. 6, 1995

[86] PCT No.: PCT/US95/04288

§ 371 Date: Oct. 4, 1996

§ 102(e) Date: Oct. 4, 1996

[87] PCT Pub. No.: WO95/27913

PCT Pub. Date: Oct. 19, 1995

[30] Foreign Application Priority Data

Apr. 7, 1994 [JP] Japan ................................ 6-069426

[51] Int. Cl.$^6$ ........................................ G02B 5/128
[52] U.S. Cl. ......................... 359/536; 359/538; 359/539; 359/540; 359/541
[58] Field of Search ........................ 359/534–539, 359/542, 540, 541

[56] References Cited

U.S. PATENT DOCUMENTS

| | | |
|---|---|---|
| 2,326,634 | 8/1943 | Gebhard et al. |
| 3,190,178 | 6/1965 | McKenzie . |
| 3,204,537 | 9/1965 | Searight ........................... 94/1.5 |
| 3,946,130 | 3/1976 | Tung et al. ...................... 428/325 |
| 4,025,159 | 5/1977 | McGrath . |
| 4,726,134 | 2/1988 | Woltman ......................... 40/582 |
| 4,896,943 | 1/1990 | Tolliver et al. . |
| 4,957,335 | 9/1990 | Kuney, Jr. . |
| 5,066,098 | 11/1991 | Kult et al. ....................... 359/540 |

FOREIGN PATENT DOCUMENTS 4-263202  9/1992  Japan ................ G02B 5/128

OTHER PUBLICATIONS

Patent Abstracts of Japan—Publication No. JP4263202, published Sep. 18, 1992.

*Primary Examiner*—James Phan
*Attorney, Agent, or Firm*—Peter L. Olson

[57] ABSTRACT

A retroreflective article comprising a monolayer of microspheres partially embedded in and protruding from a binder layer and specular reflector underlying the microspheres, wherein the monolayer of microspheres comprises a mixture of a first class of microspheres having a first refractive index and a second class of microspheres having a second refractive index wherein the second refractive index is higher than the first refractive index. As a result, the sheeting exhibits superior observation angle angularity.

10 Claims, 3 Drawing Sheets

MICROSPHERE-BASED RETROREFLECTIVE ARTICLE

FIELD OF INVENTION

The present invention relates to microsphere-based retroreflective articles, particularly microsphere-based retroreflective articles wherein the microspheres are air-incident, i.e., exposed-lens or encapsulated-lens microsphere-based retroreflective constructions, and wherein the articles exhibit wide angularity of incidence and observation.

BACKGROUND

Microsphere-based retroreflective articles are well known and have been widely used for safety purposes, such as warning emblems on vehicle or hazard warnings on roadways, and for information purposes, such as traffic control and nagvigational signs. Retroreflective articles reflect incident light rays substantially back toward the light source as a cone of light; thus light emitted by headlights of a motor vehicle toward a sign with a retroreflective face will be reflected back toward the vehicle so as to be visible to the occupants of same.

Perhaps the most common form of such articles is retroreflective sheeting, often in flexible form, which is adhered to a substrate, such as an aluminum sign panel or the side of a vehicle. Some other illustrative uses of microsphere-based retroreflective products include pavement markings and coating compositions which can be used to form retroreflective coatings on desired surfaces.

Early microsphere-based retroreflective products were typically of the exposed-lens variety wherein microspheres, having air-incident front surfaces and hemispheric reflective layers disposed behind the rear surfaces thereof, were provided on a surface, e.g., a sign on the side of a road. U.S. Pat. No. 2,326,634 (Gebhard et al.) discloses such retroreflective articles. One drawback of exposed-lens constructions is that if the surface of the article, e.g., retroreflective sheeting on a road sign, becomes wet, such as by rainfall, the water which is deposited on the front surfaces of the microspheres interferes with desired retroreflection by the sheeting, thereby "blacking out" the affected sheeting. One solution is to provide a cover film disposed in front of the microspheres, typically in substantially no more than tangential contact therewith, so as to prevent deposition of water on the front of the microspheres while retaining their air-incident interface so as to maintaining the necessary optical relationships for retroreflection. Such retroreflective articles are sometimes referred to as "encapsulated-lens" type retroreflective articles. U.S. Pat. Nos. 3,190,178 (McKenzie) and 4,025,159 (McGrath) disclose such retroreflective articles.

U.S. Pat. No. 4,957,335 (Kuney) discloses that microsphere-based retroreflective articles having high retroreflective brightness at narrow divergence or observation angles, i.e., up to 0.5°, may be made by selection of microspheres having defined combinations of average diameter and average refractive index. This patent teaches at column 4, lines 18-23, that variation in the size of the microspheres will increase the observation angle or divergence angle of the resultant retroreflective article.

U.S. Pat. No. 3,946,130 (Tung et al.) discloses that maximum retroreflectivity is obtained in a retroreflective product when all the microspheres in the product have the same predetermined index of refraction such that precise focusing of incident light rays on the reflective surface at the back of the microspheres is obtained.

Japan Unexamined Patent Application (Kokai) No. 4-263202 (to Toshiba Glass Co., Ltd.), filed Feb. 18, 1991, discloses a microsphere-based embedded-lens retroreflective sheet comprising a mixture of microspheres having a first refractive index and microspheres having a second refractive index. Such retroreflective sheeting would be expected to have relatively low retroreflective brightness as compared to exposed-lens and encapsulated-lens constructions and to exhibit poor, i.e., relatively narrow, entrance angle angularity because of its inherent configuration with a spacing layer between the microspheres and specularly reflective layer. For example, such sheetings have been observed to provide a retroreflective brightness of less than 10 candela/lux/meter$^2$ at an observation angle of 3°. In addition, the precise control of the thickness and shape of the spacing layer that is required to maximize retroreflective brightness can made such sheetings difficult to manufacture.

The need exists for retroreflective articles having wide entrance angularity and good retroreflective brightness.

SUMMARY OF THE INVENTION

The present invention provides microsphere-based retroreflective articles that exhibit superior observation angle angularity.

In brief summary, retroreflective articles of the invention comprise a monolayer of microspheres partially embedded in and protruding from a binder layer and specular reflector underlying said microspheres, wherein the monolayer of microspheres comprises a mixture of a first class of microspheres having a first refractive index between about 1.9 and about 2.1 and a second class of microspheres having a second refractive index of less than 1.9. In some embodiments, the monolayer may comprise additional classes of microspheres. Articles of the invention may be exposed-lens or encapsulated-lens type.

Retroreflective articles of the invention provide superior observation angle angularity. As a result they provide retroreflective performance that is improved in that they are visible to occupants of vehicles of a wide range of sizes, e.g., from small compact automobiles to large trucks. Signs made with such articles are more visible and legible to more drivers, making the signs more effective and affording greater safety, navigational ease, etc. to travelers on roadways. Retroreflective articles of the invention can be used for a variety of uses including traffic signs on roadways, safety barriers, navigational aids, etc. where superior observation angel retroreflective performance is desired.

BRIEF DESCRIPTION OF DRAWINGS

The invention will be further explained with reference to the drawings, wherein.

These figures, which are idealized and not to scale, and are intended to be merely illustrative and non-limiting.

DETAILED DESCRIPTION OF ILLUSTRATIVE EMBODIMENTS

In describing preferred and illustrative embodiments of the invention, specific terminology will be used for the sake of clarity. The invention, however, is not intended to be limited to the specific terms so selected, and it is to be understood that each term so selected includes all the technical equivalents that operate similarly.

Figure 1:
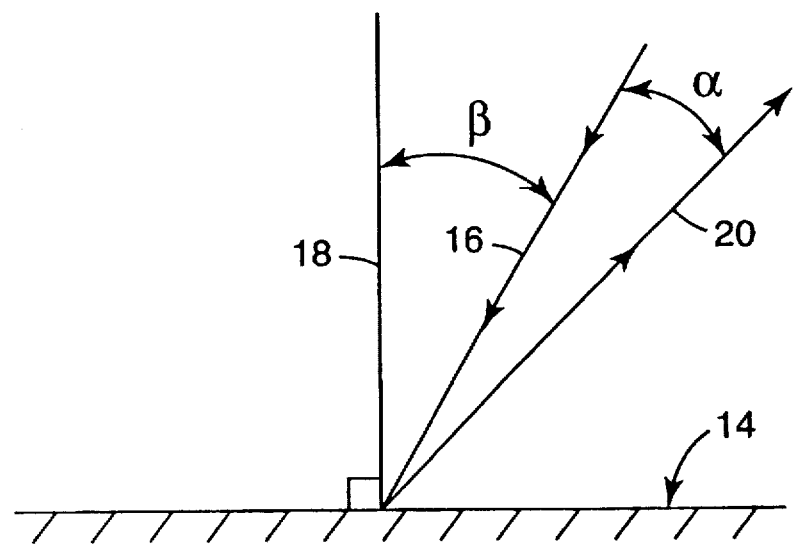
FIG. 1 is a diagram illustrating the nature and geometry of retroreflection.

Referring to FIG. 1, retroreflective surface 14 is shown with a ray or pencil of rays of light 16 coming from a distant source such as a vehicle headlight (not shown) and impinging on surface 14 at entrance angle β (the angle between incident ray 16 and normal 18 to surface 14). If surface 14 was an ordinary mirror that produced specular reflection, the emergent or reflected rays would leave surface 14 at the same angle but on the opposite side of the normal (not shown). If surface 14 was a diffuse reflector, emergent or reflected rays would go off indiscriminately in all directions (not shown) and only a small fraction would return to the source. However, with retroreflection there is a directional reflection by the surface such that a cone of brilliant light is returned toward the source, the axis of the cone being substantially the same as the axis of incident ray 16. By "cone of brilliant light" it is meant that the intensity of light within the cone is greater that would be the case where diffuse reflection occurs. This may hold true only where entrance angle β of the light does not exceed a certain value depending upon the characteristics of surface 14.

That the retroreflection is in the form of a cone is critical because of the fact that the eye of the observer is seldom on the axis of incident light. Thus in the case of an automobile approaching a highway sign, there will be an angle between any given ray of incident light approaching the sign from each headlight and the reflective rays reaching the driver's eyes. Hence if the retroreflective surface is perfect in directional action, with incident light being returned only toward its source, it would have little or no utility as a sign. There should be an expansion or spreading out of retroreflected light rays in order that persons near, but off, the axis of the incident light may take advantage of the retroreflective characteristic of the reflector or sign, but this expansion should not be excessive or the retroreflective brightness of the sign will suffer through diffusion of reflected light outside the useful range. The deviation of particular ray 20 which is visible to an occupant of the car whose headlight emitted pencil of light rays 16 is illustrated in FIG 1. The acute angle between incident ray 16 and emergent ray 20 is designated as observation or divergence angle α.

At great distances, e.g., several hundred meters or more, most vehicles present a relatively similar observation angle geometry. However, at closer distances the configuration of a vehicle, i.e., the relative location of and distances between each headlight and the driver's eyes with regard to the sign becomes more significant. For instance, at a distance of about 30 meters from a sign, for the driver of a typical automobile, the observation angle for light from a headlight to the driver's eyes is about 1° whereas for the driver of a large truck the observation angle may be substantially larger, e.g., about 3°. In order for the sign to be effective for the driver of the truck, the observation angle of retroreflected light from the truck's headlights must be reflected at a greater observation angle, i.e., the cone of brilliant light must be broader, than is necessary to benefit the driver of an automobile.

In addition, in some locations, retroreflective signs are illuminated from the side, i.e., externally. If the sign is a pure retroreflector, such illumination is of little benefit to drivers of vehicles that are typically approaching the face of the sign from directions other than that from which the illumination is coming. If the face of the sign is made with retroreflective sheeting of the invention, a substantial portion of the externally supplied light (e.g., from light sources located to the side of the sign) will be reflected by the sign at wide observation angles so as to be visible to occupants of motor vehicles. Also, such light would be visible to pedestrians, and occupants of vehicles with inoperative headlights, etc., thereby improving the functionality of the sign.

Figure 2:
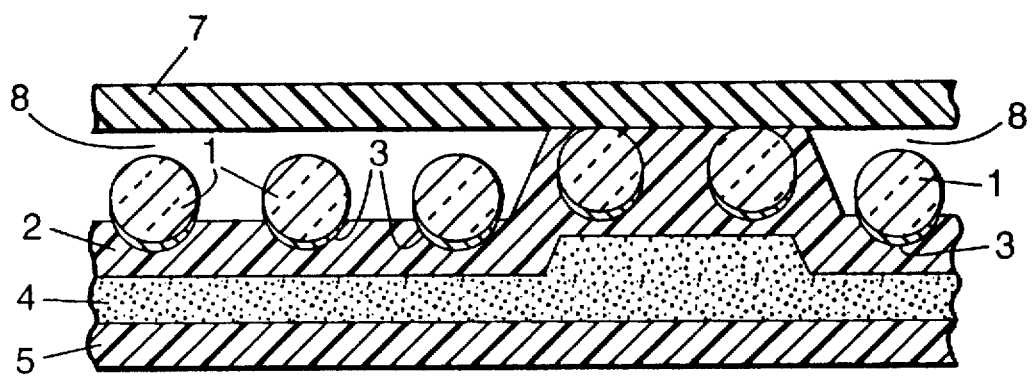
FIG. 2 is a cross-sectional illustration of a portion of an encapsulated-lens retroreflective sheeting of the invention.
Figure 3:
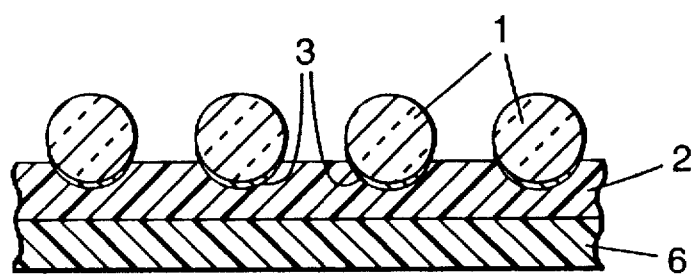
FIG. 3 is a cross-sectional illustration of a portion of an exposed-lens retroreflective sheeting of the invention.

As shown in FIGS. 2 and 3, retroreflective articles of the invention comprise monolayer of microspheres 1 partially embedded in and protruding from binder layer 2 and specular reflector 3 underlying the microspheres. The embodiment shown in FIG. 2 also comprises a cover sheet 7 attached to the article via a network of interconnection bonds to form cells 8 in which a plurality of microspheres 1 are air-incident, optional adhesive layer 4 underlying binder layer 2, and optional removable release liner 5 covering adhesive layer 4. The embodiment shown in FIG. 3 also comprises optional support 6 underlying binder layer 2.

The monolayer of microspheres comprises a mixture of a first class of microspheres having a first refractive index and a second class of microspheres having a second refractive index wherein the second refractive index is higher than the first refractive index as defined above. In some embodiments, the monolayer may comprise additional classes of microspheres with different refractive indices.

As used herein, "refractive index" is the index of refraction as measured by a polarization microscope at 20° C. and a relative humidity of 50 percent using a sodium D line spectrum in the so-called "immersion method" or Becke Line method.

The microspheres used in articles of the invention will typically have refractive indices within the range of 1.5 to 2.3. Microspheres outside this range can be used in accordance with the invention but glass microspheres having refractive indices below about 1.5 tend to be quite soft and to lose transparency and those having refractive indices above about 2.3 tend to be colored and have lower transparency.

In some embodiments, the refractive index of at least one of the classes of microspheres is between about 1.9 and about 2.1 and the refractive index of at least one of the classes of microspheres is outside the range of about 1.9 to about 2.1. Such embodiments of the invention provide an optimum combination of high retroreflective brightness and wide entrance and observation angularity.

In an illustrative embodiment, between about 10 and about 90 weight percent, preferably between about 20 and about 80 weight percent, of the microspheres are of the first class and have a refractive index between about 1.9 and about 2.1 and between about 90 and about 10 weight percent, preferably between about 20 and about 80 weight percent, of the microspheres are of the second class and have a refractive index outside the range of about 1.9 to about 2.1, but preferably between 1.5 and 2.3. Typically, as greater proportion of the microspheres is in the second class, the good observation angularity is improved.

Figure 4:
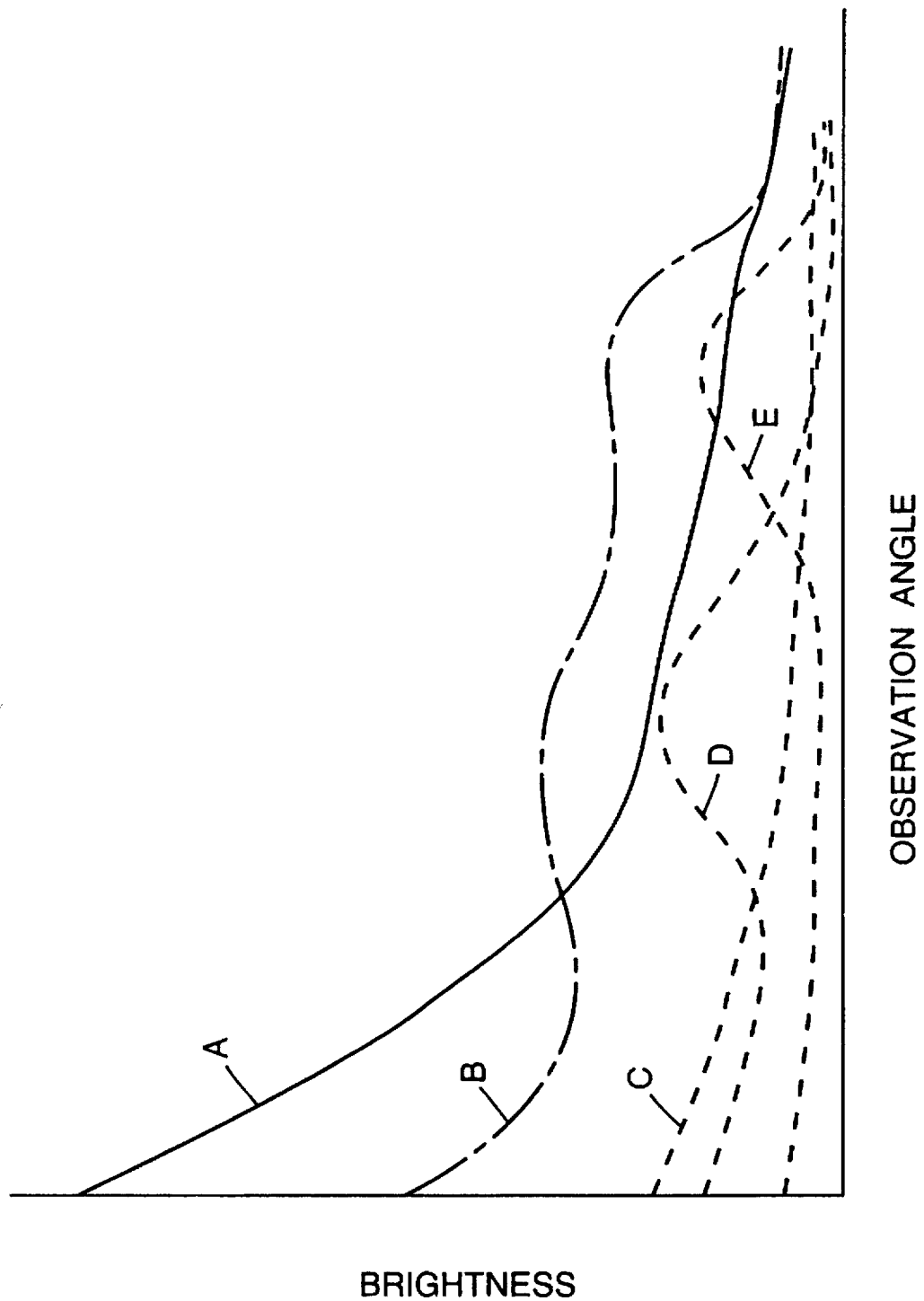
FIG. 4 is a graphical illustration of the divergence profile of a conventional microsphere-based retroreflective sheeting and of three different embodiments of the invention.

In some embodiments, the mixture of microspheres in the monolayer of microspheres will further comprises a third class of microspheres wherein the refractive index of the third class is different than the refractive index of the first and second classes, but preferably also between 1.5 and 2.3. The preferred results obtained from such embodiments are shown in FIG. 4 where the observation angle is shown on the abscissa or "X" axis and the retroreflective brightness of each article is shown on the ordinate or "Y" axis. When a mixture of classes of microspheres having different refractive indices are used in accordance with this invention, there are many peaks of the resultant retroreflective brightness and retroreflective brightness remains usefully high over a wide range of observation angles.

In some such embodiments, the refractive index of the first class of microspheres is preferably between about 0.01 and 0.15 lower than the refractive index of the second class of microspheres and the refractive index of the second class of microspheres is preferably between about 0.01 and 0.15 lower than the refractive index of the third class of microspheres. When the difference in refractive index between classes of microspheres is smaller than about 0.01, the increase of observation angle angularity is reduced whereas when the difference is in the range of about 0.01 to about 0.15 the foot portions of the peaks of luminance overlap. Preferably the difference in refractive index of different classes of microspheres is between about 0.05 and about 0.12. This phenomenon is illustrated in FIG. 4 wherein curves A–E represent the retroreflective performance of five microsphere-based retroreflective articles denoted here as A–E, respectively. Article A is a conventional air-incident microsphere-based retroreflective article comprising microspheres having a single index of refraction; article B is a retroreflective article of the invention comprising microspheres of three classes of refractive index; article C is a retroreflective article containing only microspheres of the highest refractive index class in article B; article D is a retroreflective article containing only microspheres of the middle value refractive index class in article B; and article E is a retroreflective article containing only microspheres of the lowest refractive index class in article B.

Another advantage of having the foot portions of the peaks overlap is that the "rainbow" of the retroreflective sheet disappears due to the additive color mixing of the various classes of microspheres in addition to the increase in retroreflective brightness.

In an illustrative and preferred embodiment, the article will comprise microspheres of three refractive index classes. The class of microspheres having the middle range of refractive index (e.g., between about 1.8 and about 1.9 in case A or between about 1.9 and 2.0 in case B) will constitute between about 40 and about 60 weight percent of the total number of microspheres, and the class with highest refractive index (e.g., above 1.9 in case A or above 2.0 in case B) will constitute between about 20 and about 30 weight percent of the total number of microspheres, and the class with lowest refractive index (e.g., below 1.8 in case A or below 1.9 in case B) will constitute between about 20 and about 30 weight percent of the total number of microspheres. In these ranges an optimum combination of elimination of rainbow effect, high retroreflective brightness at narrow observation angles, and wide observation angle angularity is obtained.

Typically, retroreflective articles of the invention will exhibit a retroreflective brightness of at least 10 candela/lux/meter$^2$, preferably at least 20 candela/lux/meter$^2$ at an entrance angle of 0°.

An advantage of the present invention is that the retroreflective articles provided herein exhibit good retroreflection at relatively high observation angles, making the articles well suited for use in external irradiation signs. Articles of the invention typically exhibit a retroreflective brightness of at least 1 candela/lux/meter$^2$ partially within the observation angle range of 8° to 20° at an entrance angle of 0°.

Preferably the microspheres used in articles of the present invention are substantially spherical in shape in order to provide the most uniform and efficient retroreflection. The microspheres used are preferably substantially transparent, at least to the wavelengths of light for which retroreflection is desired, so as to minimize the amount of light they absorb, thereby maximizing the amount of light which can potentially be retroreflected. In addition, microspheres used herein are preferably substantially free of bubbles and other internal discontinuities as such discontinuities may tend to interfere with desired retroreflection of the finished article.

Microspheres used in articles of the present invention are typically made from glass. Glass microspheres are typically preferred because they typically cost less, are relatively hard, and exhibit high durability, the later two characteristics being particularly important in exposed-lens embodiments of the invention. Illustrative classes of useful glass compositions include barium titanates and lead silicates, both typically with modifiers. It will be understood, however, that articles of the invention can be made with microspheres of other compositions in so long as they possess the refractive index properties discussed herein.

Typically the average diameter of the microspheres is between about 30 and about 850 microns. If the average size of the microspheres is below about 30 microns or so, retroreflective brightness tends to be diminished due to diffraction effects. If the average diameter is greater than about 850 microns, although operative in accordance with the invention, the resultant article tends to be unduly thick as a whole. When making a sheeting such as might be used on a road sign, the microspheres are preferably between about 50 and 200 microns in average diameter such that the resultant product is more flexible and not undesirably thick.

As discussed above, the microspheres have reflectors underlying them and in optical association therewith. Among the variety of materials which may be used for this purpose are specular reflectors, typically formed from vacuum-deposited, vapor-coated, or chemically deposited silver or aluminum. Aluminum or silver vapor-coatings are typically preferred because they tend to provide the highest retroreflective brightness. The reflective color of silver coatings are typically preferred to that of aluminum coatings, but an aluminum vapor coat is normally used for outdoor applications because silver reflective coatings typically suffer more severe degradation in outdoor exposure than do aluminum coatings.

The binder layer typically comprises a durable polymeric material which, as will be understood, provides good adhesion to the microspheres and preferably also to the other elements of the retroreflective article, e.g., reflective layer, cover sheet if any, etc. In many instances, the binder layer is flexible, permitting the resultant article to be bent and formed during handling and shaped into non-planar configurations. The binder layer may further comprise a whitening agent such as a pigment, e.g., titanium dioxide, to increase the overall whiteness of the resultant article. If desired, the binder layer may comprise one or more other coloring agents selected to impart desired color thereto, e.g., pigments or dyes.

A suitable binder material can be readily selected by those skilled in the art. Some illustrative examples of binder materials which can be used in retroreflective articles of the invention include thermoplastic, heat-activated, ultraviolet-cured, and electron beam-cured polymer systems. The binder layer will in large part determine the flexibility of the overall retroreflective article and should be selected accordingly.

Articles of the invention may be exposed-lens as shown in FIG. 3 or encapsulated-lens type as shown in FIG. 2.

Encapsulated-lens type articles comprise a cover sheet disposed in front of the monolayer of microspheres and a network of narrow intersecting bonds extending between the cover sheet and the binder layer from which the microspheres protrude as shown in FIG. 2. The aforementioned U.S. Pat. No. 4,025,159 discloses a preferred encapsulated-lens embodiment. As will be understood by the skilled artisan, retroreflective articles of the invention can be made in a variety of desired colors, e.g., red, blue, green, or white. U.S. Pat. No. 5,066,098 (Kult et al.) discloses selection of a suitable cover sheet for an encapsulated-lens retroreflective sheeting to attain desired good color and appearance. Selection of a suitable cover sheet will be determined in part by the conditions to which the resultant article will be exposed, its desired properties (e.g., color, outdoor durability, flexibility, glossy appearance, etc.), and the characteristics of the binder layer or network of bonds. Those skilled in the art will be able to readily select a suitable cover sheet for use in retroreflective articles of the invention.

FIG. 2 also shows optional adhesive layer 4. Suitable adhesives can be readily selected by those skilled in the art for desired applications. Illustrative examples include heat-activated, pressure-sensitive, or chemically-activated adhesives.

Further details of the invention are defined in the features of the claims.

EXAMPLES

The invention will be further explained by the following illustrative examples which are intended to be non-limiting.

Nine encapsulated-lens microsphere-based retroreflective articles of the invention (Examples 1–9) and two comparative examples (Comparative Examples A and B) were made in accordance with the invention utilizing similar microsphere densities. Examples 1–6 and 9 and Comparative Example B were encapsulated-lens type retroreflective articles and had similar cover sheets, binder layers, and network of interconnecting bonds between the cover sheet and binder layer. Examples 7 and 8 were exposed-lens type retroreflective articles and had similar binder layers as the other examples. Comparative Example A was an embedded-lens type retroreflective article of the type disclosed in Japan Unexamined Patent Application (Kokai) No. 4-263202 (to Toshiba Glass Co., Ltd.).

The number of classes of microspheres in each example or comparative example, and average refractive index, average diameter, and weight percent of total microspheres, of each class of microspheres were as indicated in Table I. The retroreflective brightness at observation angles of 3° and 1° were as indicated in Table I when measured in accordance with JIS-Z-9117-1984 except using Reflectometer Model No. LS-110 from Minolta Company, Ltd. Brightness is indicated as follows:

EX—(excellent) if 30 or more candela/lux/meter$^2$,

VG—(very good) if 20 or more and less than 30 candela/lux/meter$^2$,

G—(good) if 10 or more and less than 20 candela/lux/meter$^2$, and

NG—(not good) if less than 10 candela/lux/meter$^2$.

TABLE I

| Example | Class | Index | Size | % | Brightness 3° | Brightness 1° |
|---|---|---|---|---|---|---|
| 1 | A | 1.98 | 75 | 50 | G | VG |
|   | B | 1.75 | 75 | 50 |   |   |
| 2 | A | 1.99 | 95 | 75 | G | VG |
|   | B | 1.80 | 90 | 25 |   |   |
| 3 | A | 1.93 | 90 | 50 | G | EX |
|   | B | 1.85 | 90 | 50 |   |   |
| 4 | A | 1.98 | 100 | 40 | G | EX |
|   | B | 1.85 | 100 | 50 | G | EX |
|   | C | 1.79 | 100 | 10 | G | EX |
| 5 | A | 1.90 | 60 | 75 | G | EX |
|   | B | 1.55 | 60 | 25 | G | EX |
| 6 | A | 1.95 | 55 | 25 | G | EX |
|   | B | 1.70 | 50 | 75 | G | EX |
| 7 | A | 1.99 | 95 | 75 | G | EX |
|   | B | 1.80 | 50 | 25 |   |   |
| 8 | A | 1.93 | 75 | 50 | EX | EX |
|   | B | 1.85 | 75 | 50 |   |   |
| 9 | A | 1.95 | 95 | 20 | EX | EX |
|   | B | 1.83 | 95 | 50 |   |   |
|   | C | 1.71 | 95 | 30 |   |   |
| A | A | 2.30 | 120 | 50 | NG | G |
|   | B | 2.10 | 60 | 50 |   |   |
| B | A | 1.93 | 50 | 100 | NG | VG |

In addition, the sheets were illuminated at a perpendicular angle, i.e., an entrance angle of 0°, with a tungsten lamp and the sample observed at observation angles between 0.2° and 25° by the naked eye to evaluate whether any rainbow effect was visible or not. No rainbow was observed in any of Examples 1–9 or Comparative Examples A or B.

Five more encapsulated-lens microsphere-based retroreflective articles of the invention (Examples 10–14) were made in accordance with the invention. Each had a similar binder layer, cover sheet, and network of bonds between binder layer and cover sheet. The number of classes of microspheres in each example or comparative example, and average refractive index, average diameter, and weight percent of total microspheres, of each class of microspheres were as indicated in Table II. The retroreflective brightness (candela/lux/meter$^2$), measured as described above, at observation angles indicated in Table II were as indicated. Brightness for each of Examples 10–14 was VG at 1° and G at 3°.

TABLE II

| Example | Class | Index | Size | % | Brightness 8.5° | 10.0° | 13.5° | 16.6° | 20.0° |
|---|---|---|---|---|---|---|---|---|---|
| 10 | A | 1.90 | 90 | 30 | 2.0 | 0.7 | 0.4 | 0.3 | 0.2 |
|    | B | 1.70 | 90 | 70 |     |     |     |     |     |
| 11 | A | 1.90 | 85 | 40 | 1.5 | 2.1 | 0.7 | 0.4 | 0.2 |
|    | B | 1.65 | 85 | 60 |     |     |     |     |     |
| 12 | A | 1.90 | 90 | 40 | 1.0 | 0.9 | 1.8 | 0.7 | 0.5 |
|    | B | 1.60 | 90 | 60 |     |     |     |     |     |
| 13 | A | 1.90 | 95 | 50 | 0.7 | 0.7 | 0.8 | 1.5 | 0.6 |
|    | B | 1.55 | 95 | 50 |     |     |     |     |     |
| 14 | A | 1.90 | 95 | 50 | 0.7 | 0.6 | 0.7 | 0.6 | 1.3 |
|    | B | 1.50 | 95 | 50 |     |     |     |     |     |
| B  |   | 1.93 | 50 | 100 | 0.6 | 0.4 | 0.3 | 0.2 | 0.1 |

Various modifications and alterations of this invention will become apparent to those skilled in the art without departing from the scope and spirit of this invention.

What is claimed is:

1. A retroreflective article comprising a monolayer of microspheres (1) partially embedded in and protruding from a binder layer (2) and specular reflector (3) underlying said microspheres, characterized in that said monolayer of microspheres comprises a mixture of a first class of microspheres having a first refractive index between about 1.9 and about 2.1, and a second class of microspheres having a second refractive index of less than 1.9.

2. The article of claim 1 wherein the refractive indices of said microspheres is between about 1.5 and about 2.1.

3. The article of claim 1 wherein the difference in refractive index between said first class of microspheres and said second class of microspheres is between about 0.01 and about 0.15.

4. The article of claim 1 wherein the difference in refractive index between said first class of microspheres and said second class of microspheres is between about 0.05 and about 0.12.

5. The article of claim 1 wherein between about 10 and about 90 weight percent of said microspheres are of said first class and between about 90 and about 10 weight percent of said microspheres are of said second class.

6. The article of claim 1 further comprising a third class of microspheres having a refractive index different from the first class and from the second class.

7. The article of claim 6 wherein the refractive index of said first class of microspheres is between about 0.01 and 0.15 lower than the refractive index of said second class of microspheres and where the refractive index of said second class of microspheres is between about 0.01 and 0.15 lower than the refractive index of said third class of microspheres.

8. The article of claim 1 wherein the average diameter of said microspheres is between about 30 and about 850 microns.

9. The article of claim 1 wherein said microspheres are exposed.

10. The article of claim 1 further comprising a cover sheet (7) disposed in front of said micropsheres and a network of narrow intersecting bonds extending between said cover sheet and said binder layer.

* * * * *